Feb. 21, 1961  E. J. HERBENAR ET AL  2,972,496
JOINT ASSEMBLY
Filed Dec. 30, 1957

Inventors
EDWARD J. HERBENAR
SYLVESTER S. MAZUR

By Hill, Sherman, Meroni, Gross & Simpson  Attys

United States Patent Office 2,972,496
Patented Feb. 21, 1961

2,972,496

JOINT ASSEMBLY

Edward J. Herbenar and Sylvester S. Mazur, Detroit, Mich., assignors to Thompson Ramo Wooldridge, Inc., a corporation of Ohio Filed Dec. 30, 1957, Ser. No. 706,201

5 Claims. (Cl. 287—90)

This invention relates to a joint suitable for use in a tie rod connection for the steering apparatus of automotive vehicles and more particularly, to a joint in which the stud of the joint is held continuously in seated relation with a bearing in the socket of the joint.

Tie rod joints which are presently in use provide spring supported means for maintaining the stud member in proper seated relationship against a bearing within the socket. However, load forces on the socket which are perpendicular to the axis of the socket produce a resultant force in the direction of the axis of the socket which unseats the stud relative to the bearing. Consequently, fatigue is induced in the supporting spring, and the socket becomes loose and wears quickly.

We have provided a joint which eliminates the above mentioned difficulties by positioning a stud-supporting seat for the joint upon a plurality of wedges. The stud is held in seated relation against the socket bearing by means of a resilient element which biases the wedges radially inwardly relative to one another and thus cams the stud supporting seat upwardly against the stud.

It is, therefore, an object of the present invention to provide a joint in which a stud member is held in seated position against a bearing within the socket of the joint by means of a plurality of wedges supporting a seat so as to bear the main stress from the stud. The inclination of the upper surface of the wedges is such that the horizontal force component which would tend to move the wedges away from one another is relatively small, so that the stud will not be unseated except under unusual stress.

Another object of the invention is to provide a joint as described in which a resilient element, preferably a "garter" spring, is placed around the wedges to bias them radially inwardly beneath the stud supporting seat so as to cam the seat upwardly. The spring thus described will not become fatigued, since it is not directly supporting the seat and stud. Instead, only the relatively small horizontal component of stress is taken up by the spring.

Another object of the invention is to provide a joint as described in which the seat for supporting the stud is provided with a bottom surface which is complementary to the radially inward inclination of the wedges so that the seat rests securely upon the wedges to provide a steady bearing for the stud.

Another object of the invention is to provide a joint as described in which the stud is provided with a substantially frusto-conical head, while the bearing is provided with an inner surface complementary to the head and an outer surface of segmental spherical configuration, in a preferred form thereof, so that rotation of the stud takes place with respect to the inner bearing surface and tilting of the stud takes place with respect to the outer bearing surface to avoid wear in the joint; while the tendency of the stud to unseat itself relative to the bearing which the tapered relationship between stud and bearing would otherwise produce is countered by the seat supporting wedges.

Another object is to provide a method for assembling the joint of the invention in which the wedges are positioned for mounting upon the joints by means of a pin adapted to hold the wedges upon a bottom wall of the socket as a sub-assembly, so that the bottom wall may be rolled into position in the socket with the wedges in proper radial alignment.

Other objects and advantages of the invention will become apparent as the description proceeds in accordance with the drawings in which.

Figure 1:
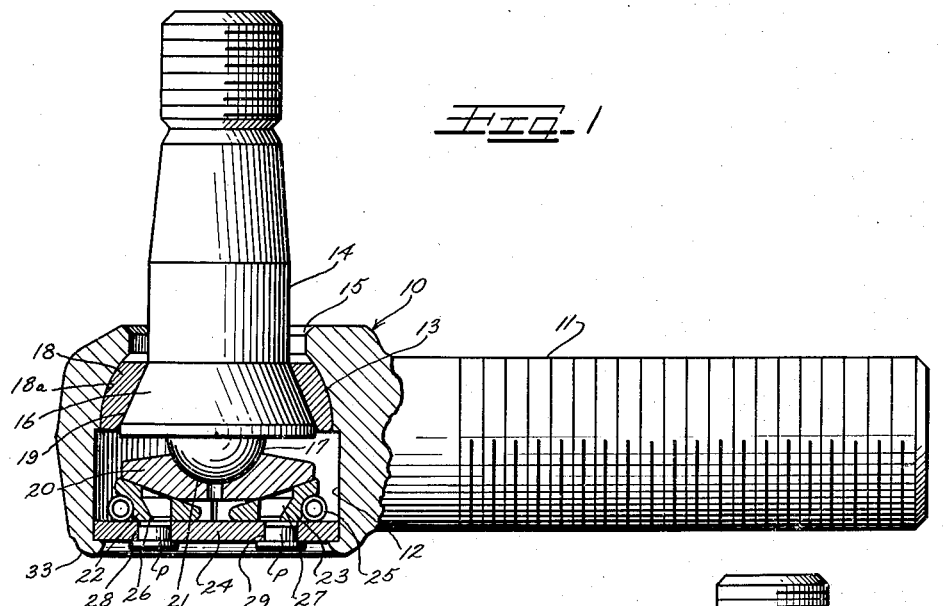
Figure 1 is a side elevational view partly in vertical section, of a joint according to the present invention.
Figure 2:
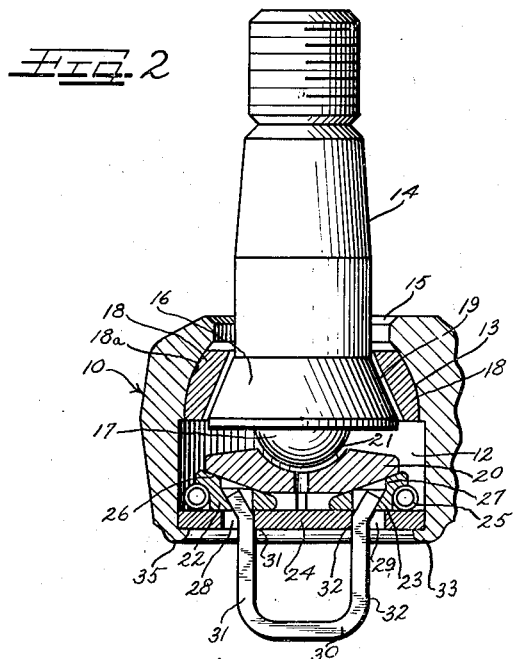
Figure 2 is a view corresponding to the view of Figure 1 showing the wedges and bottom wall of the socket assembled upon a pin in accordance with the method of the invention.

Referring now to Figures 1 and 2, the reference numeral 10 indicates a socket or housing for the joint of the invention having a laterally extending threaded shank 11 which is adapted to be threaded into the end of a tie rod. The socket or housing 10 is provided with a cylindrical axial bore 12 having an upper portion 13 of segmental spherical configuration. A stud 14 extends within the bore 12 through an aperture 15 in the socket 10.

In order to maintain the stud 14 rotatably within the socket 10, a frusto-conical head 16 is formed integrally with the stud 14 and a rounded segmental spherical boss 17 is formed on the head 16. The head 16 is adapted to seat against a bearing 18 whose inner surface 19 is tapered in complementary relationship to the head 16, the outer surface 18a of the bearing 18 being segmentally spherical to afford tilting movement relative to the socket 10. Wear upon the bearing and the joint is thus substantially reduced by providing separate bearing surfaces for tilting and rotation, although the taper of the head 16 inwardly toward the aperture 15 is one of the factors producing the resultant force along the axis of the stud 14 which tends to move the stud away from the bearing 18 when stress is applied laterally and radially upon the socket 10. The stud 14 is supported at its lower end by a seat 20 whose upper surface defines a concave recess 21 so as to engage the boss 17 in bearing relationship.

In order to prevent the stud 14 from unseating with respect to the bearing 18 the undersurface of the seat 20 is tapered outwardly and upwardly at a predetermined angle which is complementary to the upper surfaces of a pair of wedges 22 and 23 upon which the seat 20 is fixedly positioned. The wedges 22 and 23 are slidably supported upon a bottom wall 24 of the socket, and maintain the seat 20 in bearing relation with the head 16. To hold the head 16 continuously in seated position in the bearing 18, a spring or resilient element 25 is placed around the wedges 22 and 23, the wedges being contoured at their outer ends for this purpose. The angle of inclination of the upper surfaces of the wedges is relatively small so that the wedges must move apart radially a considerable amount before the stud can become unseated. Also, this construction assures that the horizontal component of any force tending to unseat the stud is relatively small and will not ordinarily be effective against the spring 25. The relatively greater downward or vertical force at such times will act to create further resistance to radial outward movement of the wedges 22 and 23. The spring 25 has a tension sufficient to hold the wedges 22 and 23 in position beneath the seat 20 without producing undesirable binding in the socket connection.

In order to assure a proper radial alignment of the wedges 22 and 23 with respect to the seat 20, and so that spring 25 will be effective to hold the stud 14 in seated position, the wedges are provided with apertures 26 and 27 which extend centrally therethrough but with their outer walls tapered outwardly. The bottom wall 24 is provided with corresponding apertures 28 and 29 which are disposed to be in register with the apertures 26 and 27 when the wedges are in proper radial alignment. When the joint 10 is assembled, the wedges 22 and 23 tend to pack together because of the force of the spring 25; and to overcome this action, a U-shaped pin 30 is provided having legs 31 and 32 which are tapered outwardly at their upper ends in complementary relationship to the outer walls of apertures 26 and 27.

In assembling the joint 10, therefore, the bottom wall 24 is first placed on the pin and thereupon the wedges 22 and 23 are placed upon the legs 31 and 32 respectively. The stud 14 itself is used to define the position of the bottom wall 24 and when the seat 20 is positioned between the boss 17 and the wedges 22 and 23, the edge 33 of the socket is rolled into locking position on the bottom wall 24. The pin 30 is then withdrawn, and the legs 31 and 32 simultaneously act to cam the wedges 22 and 23 outwardly against the spring 25 to free them from any binding action which may have been provided by the rolling-in action. The wedges will immediately thereafter be moved into proper position beneath the seat 20 by the spring 25. Thereafter, the joint may be lubricated through the apertures 28 and 29 and the apertures then may be sealed as shown in Figure 1 with pressed in plastic or metal plugs P.

Figure 3:
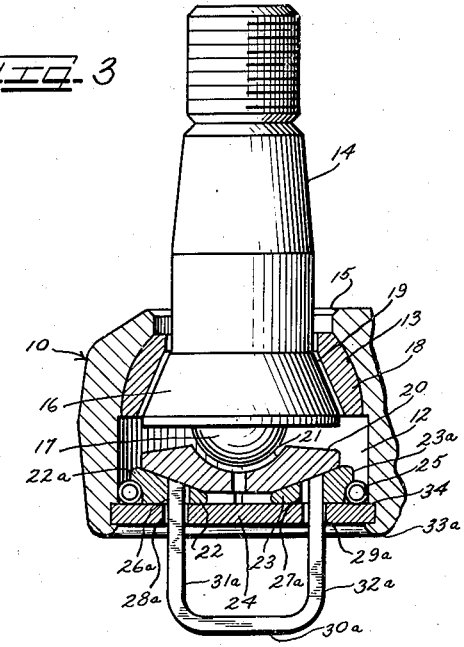
Figure 3 is a side elevational view, partly in section, of a second embodiment of the invention.

Referring now to Figure 3, a second embodiment of the invention is seen which is similar to the embodiment of Figures 1 and 2 and in which similar parts are designated by similar numerals. However, in this embodiment the bottom wall 24 is seated against an annular shoulder 34 within the bore 12 produced by counterboring the bore 12 to a relatively greater diameter at its lower end. Thus, the bottom wall 24 is in predetermined correct alignment axially relative to the socket 10 and to the stud 14 and bearing 18. Since there is no possibility of binding, because alignment is accomplished by the shoulder 34 rather than by the stud 14 as in the first embodiment, there is no need for the previously described outward camming of the wedges upon completion of the rolling-in of the bottom wall 24. Thus, the legs 31a and 32a of the pin 30a are preferably straight and engage within the apertures 26a and 27a of the wedges 22a and 23a so as to bias the wedges slightly outwardly of their preferred positions initially. In other respects, the method used for the embodiment of Figure 2 is identical to that of Figure 1. Upon completion of the rolling-in of the wall 24, the wedges 22a and 23a will be forced inwardly upon retraction of the pin 26a by the force of the spring 25. In this second embodiment however, because of the initial alignment of the bottom wall 24 by the shoulder 34, the pin 30a may be retracted either before or after the rolling-in of the wall, so long as the wall is held firmly against the shoulder 34.

It will be appreciated that other relationships and contours may be provided for the head 16 and the bearing 18 than those herein set forth, and which similarly produce a tendency of the stud to unseat itself within the socket. However, the structure of the invention will be effective to prevent the stud from becoming unseated in all such cases, and will also hold the bottom wall of the socket in position. Thus the joint of the invention affords an exceptionally long life as well as simplicity and solidity of construction.

Although we have herein set forth and described our invention with respect to serve its specific principles and details thereof, it will be obvious to those skilled in the art that these may be varied without changing the basic principles of the invention, and we therefore do not propose limiting the patent granted hereon otherwise than as necessitated by the prior art.

We claim as our invention:

1. A ball and socket type joint which comprises an open ended housing having an internal bearing wall converging to one open end and a shoulder at the other open end facing the bearing wall, a stud having a shank extending freely through said one open end and a head carried by said stud in tiltable and rotatable relation relative to said wall, a rounded boss depending from said head, a seat in said housing receiving said boss, a closure member for said other open end of the housing bottomed on said shoulder, a plurality of wedges between the seat and closure member, and contracting spring means surrounding the wedges and effective to bias the wedges toward each other to simultaneously urge the closure member against the shoulder and the seat against the boss thereby to hold the stud head in proper bearing relation relative to the bearing wall.

2. An assembly unit for use in assembling a joint having a socket, a stud extending from the socket, a head on the stud rotatably and tiltably received in the socket, a bearing in the socket receiving the stud head in seated relation, and a seat having a bottom side tapered radially upwardly and an upper side supporting the head in bearing relation thereto, comprising a plurality of wedges tapering radially inwardly and each defining an aperture, a bottom wall for said socket defining a plurality of apertures, spring means biasing said wedges radially toward one another, and pin means removably inserted in said apertures in said bottom wall and said apertures in said wedges whereby said bottom wall and said wedges may be seated in said socket as a unit with said wedges in predetermined radial alignment and abutting engagement with said seat and with said wedges maintained against radial inward displacement by said spring means until said bottom wall is secured in said socket.

3. In a joint, a socket, a stud extending from said socket in rotatable and tiltable relation thereto, a head on said stud disposed within said socket, a seat in said socket having an upper bearing surface engaging said head in rotatable, supported relationship thereto, a plurality of wedges beneath said seat having inwardly and downwardly inclined upper surfaces, a bottom wall for said socket and slidably supporting each of said wedges and means biasing said wedges radially inwardly toward each other, said wedges being spaced from one another and supporting said seat against tilting relative to said bottom wall.

4. In a joint, a socket, a stud extending from said socket in rotatable and tiltable relation thereto, a head on said stud disposed within said socket, a seat in said socket having an upper bearing surface engaging said head in rotatable, supported relationship thereto, a plurality of wedges beneath said seat having inwardly and downwardly inclined upper surfaces, a bottom wall for said socket and slidably supporting each of said wedges and means biasing said wedges radially inwardly toward each other, said wedges being spaced from one another and supporting said seat, the bottom surface of said seat being peripherally inwardly and downwardly inclined in complementary relationship to said wedges.

5. In a joint, a socket, a stud extending from said socket in rotatable and tiltable relation thereto, a head on said stud disposed within said socket, a seat in said socket having an upper bearing surface engaging said head in rotatable, supporting relationship thereto, a plurality of wedges beneath said seat having upper surfaces inclined downwardly and inwardly, a bottom wall for said socket slidably supporting each of said wedges, said wedges being spaced from one another and supporting said seat, the bottom surface of said seat being peripherally inwardly and downwardly inclined in complementary relationship to said wedges, and means urging said wedges radially inwardly toward one another comprising a spring substantially parallel with said bottom wall and surrounding said wedge members peripherally.

References Cited in the file of this patent

UNITED STATES PATENTS

| | | |
|---|---|---|
| 1,848,471 | Gebert et al. | Mar. 8, 1932 |
| 2,539,186 | French | Jan. 23, 1951 |
| 2,618,049 | Flumerflet | Nov. 18, 1952 |
| 2,715,766 | Ricks | Aug. 23, 1955 |